United States Patent Office 2,776,330
Patented Jan. 1, 1957

2,776,330

PRODUCTION OF SPONGE RUBBER

Frederick Arthur Jones, Castle Bromwich, Birmingham, John Leathem Matthew Newnham, Birmingham, and Douglas Jackson McKeand, Sutton Coldfield, England, assignors to Dunlop Tire and Rubber Corporation, Buffalo, N. Y., a corporation of New York No Drawing. Application February 26, 1953, Serial No. 339,156

Claims priority, application Great Britain March 1, 1952

8 Claims. (Cl. 260—723)

This invention relates to the production of sponge rubber.

It is known to make sponge rubber by compounding natural rubber latex with a vulcanising agent and a frothing agent, e. g. a fatty acid soap, frothing the compounded latex by beating air into it and adding zinc oxide and an acid-forming delayed-action gelling agent, e. g. an alkali metal silicofluoride. The froth is moulded while it is mobile, and as the pH value falls the gelling agent becomes effective while the froth is still alkaline. The froth may be shaped in closed moulds, or it may be shaped with a free upper surface, i. e. in open topped moulds or on a sheet-like conveyor with deckle belts at the edges so that continuous sheets are produced.

In order that sponge rubber with satisfactory physical properties may be obtained gelation should occur before partial break-down of the froth, otherwise some cavities in the sponge may be considerably larger than the majority or there may be splitting at the surfaces of the froth on vulcanisation. If the froth is moulded with a free upper surface there may be blisters on the surface, or cavities if a blister is formed which subsequently bursts. The formation of a good sponge structure depends upon a number of factors, including for example, the pH value at which gelation takes place and the composition of the compounded latex.

We have found that in the production of sponge rubber by the above-described method it is advantageous to have present in the latex before gelling a small proportion of an acyclic polyalkylene polyamine.

According to our invention therefore a method of producing sponge rubber from a frothed natural rubber latex comprises gelling the frothed latex in the presence of an acyclic polyalkylene polyamine or a mixture of such polyamines.

The frothed latex may be gelled by any suitable means such as treatment with a delayed-action acid-forming gelling agent at normal temperatures, or alternatively with a hot gelling agent, i. e. a compound or compounds which sensitise the mix such that it gels on warming, e. g. to temperatures of 40–80° C.

In the presence of a polyalkylene polyamine natural rubber latices which under normal gelling conditions give weak and non-uniform gels yield gels of improved characteristics such as increased tensile strength, increased firmness and greater uniformity of pore size. These results are obtained with natural rubber latices which have been preserved with ammonia only and also with latices which have been preserved with ammonia and a polychlorophenate. Thus a 60% rubber latex preserved with 0.3% sodium pentachlorophenate and 0.1% ammonia which on gelling with sodium silicofluoride formed a pasty gel at a pH value of 7.0 gelled to a firm gel with sodium silicofluoride at a pH value of 7.8 after 0.3% of triethylene tetramine based on the rubber had been added to it. As a result of the modified gelling conditions which result from the presence of the polyalkylene polyamine in the latex an improved sponge structure is obtained; that is to say, the cavities of the sponge structure are more nearly uniform in size, and if the latex is gelled with an upper free surface the free surface is not spoiled by the formation of blisters or cavities.

We have also found that products with a good foam structure result over a wider range of gelling pH values so that it is not necessary to pay as close attention as would otherwise be needed to the selection and compounding of a latex so that it gels within a suitable range of pH values.

The invention may be applied, for example, to the production of sponge rubber from natural rubber latices compounded with sulphur, a vulcanisation accelerator comprising an N-substituted dithiocarbamate, with or without another vulcanisation accelerator, e. g. a mercaptothiazole, a fatty acid soap, zinc oxide, and an alkali metal silicofluoride.

The N-substituted dithiocarbamate accelerator may be one in which the substituent is a hydrocarbon radical containing up to 8 carbon atoms, and preferably the accelerator is a dialkyl N-substituted dithiocarbamate, e. g. a dimethyl dithiocarbamate or a diethyl dithiocarbamate. There may also be used an alkyl aryl-N-substituted dithiocarbamate, e. g. a methyl phenyl dithiocarbamate or an ethyl phenyl dithiocarbamate, or a dithiocarbamate in which the nitrogen atom of the dithiocarbamate radical forms part of a ring structure comprising a hydrocarbon radical, as in the case of pentamethylene dithiocarbamate or lupetidine dithiocarbamate. The dithiocarbamate may be water-soluble as is the case for most of the alkali metal salts or water-insoluble as is the case for most of the cadmium and zinc salts.

The above-mentioned compounds may be incorporated with the rubber latex in the amounts customarily employed in the production of sponge rubber. Thus the compounded rubber latex may contain for every 100 parts by weight of natural rubber 2 to 5 parts by weight of sulphur, 0.5 to 2 parts by weight of vulcanising accelerator, 1 to 5 parts by weight of zinc oxide, 1 to 5 parts by weight of the alkali metal silicofluoride and 0.1 to 0.5 part by weight of fatty acid soap. The compounded latex may also contain other customary compounding materials, in particular an antioxidant, a softener and a filler.

The polyalkylene polyamine incorporated in the rubber latex is preferably an amine of the type

$$H_2NR.(NH.R)_nNH_2$$

where R is a lower alkylene radical, and $n$ is a small integer, e. g. 1 to 4; R may be an alkylene radical containing up to 3 carbon atoms, for example a methylene or ethylene radical. Typical polyalkylene polyamines which may be used are diethylene triamine, triethylene tetramine, tetraethylene pentamine, pentamethylene hexamine, dipropylene triamine, or mixtures of these polyamines.

The amount of the polyalkylene polyamine to be added will depend on the latex, more being required if it is preserved with a polychlorophenate and ammonia than if it is preserved with ammonia alone, and also on the proportion of soap added as a frothing agent, more being needed the smaller the amount of soap. For an ammonia-preserved latex containing from 0.1 to 2.0 parts by weight of a fatty acid soap per 100 parts of rubber, suitable amounts of polyalkylene polyamine are from 0.1 to 1.0 part by weight to every 100 parts by weight of rubber, preferably from 0.1 to 0.5 part by weight per 100 parts of rubber.

The natural rubber latex used in performing this invention may be mixed with one or more synthetic rubber latices, such as a latex obtained by copolymerisation of butadiene with a compound copolymerisable therewith, provided the proportion of natural rubber latex amounts to from about 50 percent by weight to 100 percent by weight of the total latex.

In carrying out the invention a natural rubber latex may be compounded in the customary manner with sulphur, a vulcanisation accelerator, a fatty acid soap and the polyalkylene polyamine in the amounts indicated above, and the latex allowed to mature. The compounded latex is next frothed by beating air into it by mechanical agitation, zinc oxide and an acid-forming delayed action gelling agent are added, the frothed latex poured into moulds and allowed to gel in the cold or in the warm, and the gel is then vulcanised.

The following examples illustrate the invention, all parts being by weight:

*Example 1*

A natural rubber latex containing 60% rubber solids and preserved with 0.25% of ammonia was compounded so that it contained for every 100 parts of rubber 2.5 parts of sulphur, 0.25 part of an antioxidant, 0.1 part of carbon black, 10 parts of mineral oil, 1 part of zinc diethyldithiocarbamate and 0.5 part of mercaptobenzthiazole. To this compounded latex was added 0.5 part of castor oil soap and 0.2 part of tetraethylene pentamine. The latex was then frothed to approximately 5 times its volume by beating air into it and then 3 parts of zinc oxide and 1 part of sodium silicofluoride were mixed with the froth, which was poured into moulds and allowed to gel at 25° C. and was then vulcanised in steam at 100° C. and dried. The resultant sponge rubber had a much more nearly uniform sponge structure than the product made in a similar way without the addition of the tetraethylene pentamine.

Similar products were obtained when the same amount of triethylene tetramine was used instead of the tetraethylene pentamine.

*Example 2*

A natural rubber latex containing 60% of rubber solids and preserved with 0.3% of sodium pentachlorophenate and 0.1% of ammonia was compounded with sulphur, soap and vulcanising accelerators as in Example 1 and with 0.2 part of tetraethylene pentamine per 100 parts of rubber. The compounded latex was frothed to 5 times its volume by beating air into it, zinc oxide and sodium silicofluoride were added as in Example 1, and the froth was then poured into the moulds, allowed to gel at 25° C., vulcanised in steam at 100° C. and dried. The resultant sponge rubber had a much more nearly uniform sponge structure than a sponge rubber obtained similarly from another batch of the same latex but without any addition of polyamine.

*Example 3*

A natural rubber latex containing 60% rubber solids and preserved with 0.25% of ammonia was compounded so that it contained for every 100 parts of rubber, 2.5 parts of sulphur, 0.25 part of an antioxidant, 0.1 part of carbon black, 1 part of zinc diethyldithiocarbamate and 0.5 part of mercaptobenzthiazole. To this compounded latex was added 0.5 part of castor oil soap and 0.2 part of triethylene tetramine. The latex was frothed to approximately 5 times its volume by beating air into it and then 3 parts of zinc oxide and 0.4 part of ammonium acetate (added as a 10% solution) were mixed with the froth which was poured into moulds and allowed to gel at 50° C. and then vulcanised in steam at 100° C. washed and dried. The resultant sponge rubber had a much more nearly uniform structure than the product made in a similar way without the addition of triethylene tetramine.

*Example 4*

A natural rubber latex containing 60% of rubber solids and preserved with 0.15% of ammonium pentachlorphenate and 0.1% ammonia was compounded with sulphur, soap and vulcanising ingredients as in Example 3, and with 0.4 part of triethylene tetramine per 100 parts of rubber. The compounded latex was frothed to 5 times its volume by beating air into it, and then 3 parts of zinc oxide and 0.6 part of ammonium acetate (added as a 10% solution) were mixed with the froth which was poured into moulds and allowed to gel at 45° C. and then vulcanised in steam at 100° C., washed and dried. The resultant sponge rubber had a much more nearly uniform structure than the product made in a similar way without the addition of triethylene tetramine.

Having described our invention, what we claim is:

1. A process of making cellular rubber products which comprises compounding a latex containing rubber hydrocarbons in which the rubber hydrocarbons comprise from 50 percent to 100 percent of natural rubber with sulphur, vulcanization accelerators and an acyclic polyalkylene polyamine of the formula $H_2N \cdot C_2H_4 \cdot (NHC_2H_4)_n NH_2$ in which $n$ equals from 1 to 4, beating said latex with air to form a foam and gelling said foamed latex with a delayed action gelling agent.

2. The method of claim 1 wherein the amount of said polyamine is from 0.1% to 1.0% of the weight of the rubber.

3. The method of claim 1 wherein the frothed latex is gelled by means of a delayed action acid forming gelling agent.

4. The method of claim 1 wherein the frothed latex is gelled by warming to a temperature from 40° C. to 80° C.

5. The method of claim 3 in which the delayed action gelling agent is silicofluoride.

6. The method of claim 1 in which the latex contains ammonia and a fatty acid soap.

7. The method of claim 6 in which the latex contains an alkali pentachlorphenate.

8. A method of making cellular rubber products which comprises compounding a latex containing rubber hydrocarbons in which the rubber hydrocarbons comprise from 50% to 100% of natural rubber with sulphur, vulcanization accelerators and an acyclic polyalkylene polyamine of the formula $H_2NR \cdot (NHR)_n NH_2$ in which R represents an alkylene radical having up to three carbon atoms and $n$ equals from 1 to 4, beating said latex with air to form a foam and gelling said foamed latex with a delayed action gelling agent.

References Cited in the file of this patent

UNITED STATES PATENTS

| | | |
|---|---|---|
| 2,360,913 | Van Valkenburgh | Oct. 24, 1944 |
| 2,476,827 | Wohler et al. | July 19, 1949 |
| 2,484,434 | Van Buskirk et al. | Oct. 11, 1949 |
| 2,567,988 | Bethe | Sept. 18, 1951 |

OTHER REFERENCES

Bennett: "Concise Chemical and Technical Dictionary," 1947 edition, page 945, column 1.